Jan. 10, 1961   P. H. GARNER   2,967,576
OFFSET DISC HARROW
Filed Oct. 28, 1957   2 Sheets-Sheet 1
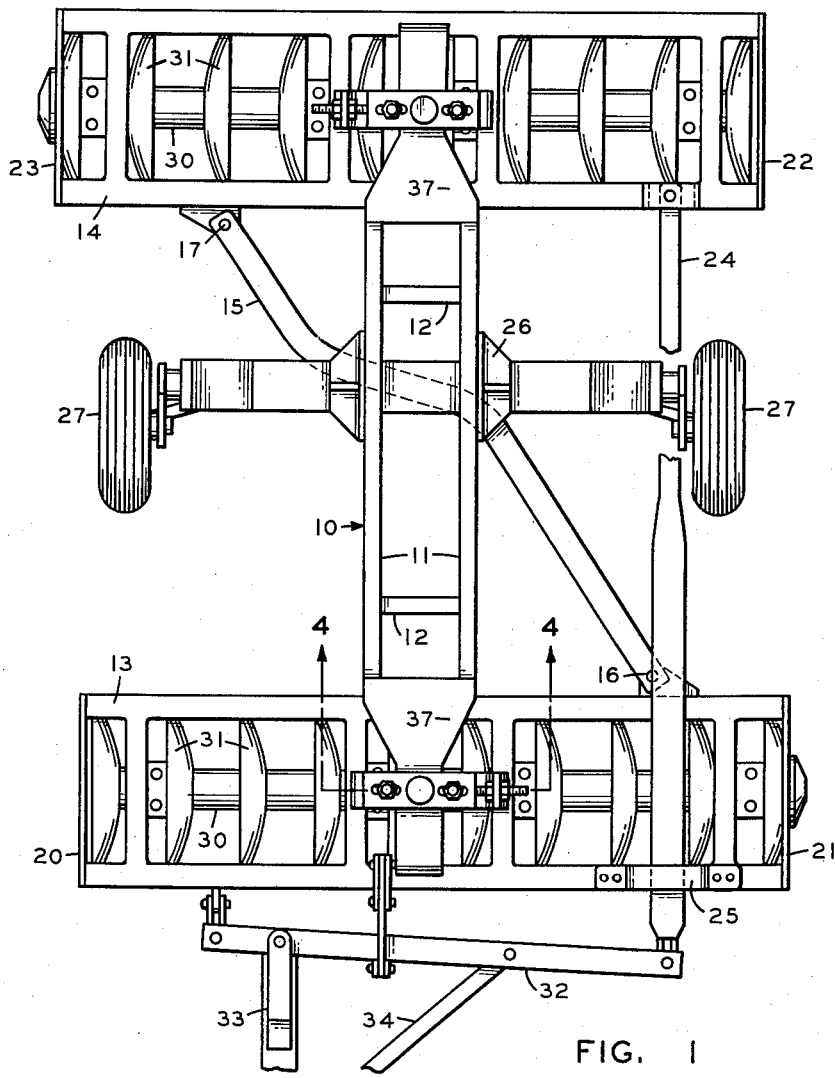
FIG. 1
FIG. 2
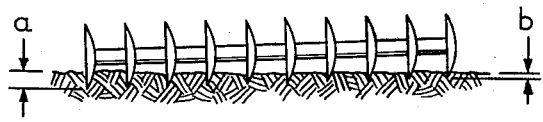
FIG. 3
INVENTOR.
PAUL H. GARNER
BY *Cohn and Powell*
ATTORNEYS Jan. 10, 1961 P. H. GARNER 2,967,576
OFFSET DISC HARROW
Filed Oct. 28, 1957 2 Sheets-Sheet 2

INVENTOR.
PAUL H. GARNER
BY Cohn and Powell
ATTORNEYS

United States Patent Office 2,967,576
Patented Jan. 10, 1961

2,967,576

OFFSET DISC HARROW

Paul H. Garner, % Alexander Manufacturing Co., Picayune, Miss.

Filed Oct. 28, 1957, Ser. No. 692,808

9 Claims. (Cl. 172—583)

This invention relates generally to improvements in a disc harrow, and more particularly to an improved assembly for maintaining the gang frame or frames in a position to assure a uniform depth of cut by the disc gangs.

It is an important objective of the present invention to overcome a serious fault or disadvantage inherent in disc harrows, which is the tendency of the disc at one side of the gang frame to cut into the soil more deeply than the disc at the opposite side of that gang frame.

In an offset disc harrow, the leading side, or that side toward which the concave sides of the disc are directed, of the front gang frame will seek a lower level of soil penetration than the opposite or training side of that gang frame; and the leading side of the rear gang frame, which is opposed to the leading side of the front gang frame, will penetrate the soil more deeply than the trailing side thereof. This inherent tendency in offset harrows is frequently referred to as "scissoring" and its effect precludes a uniform depth of cut. Different soil conditions, such as a very wet soil, very dry soil, very heavy soil, medium loam soil and sandy soil, all have varying degrees of effect on the inherent tendency of this type of implement to scissor. An important objective is achieved by providing mechanism on the disc harrow which can be adjusted to compensate for any soil condition and to assure a level plow action on the part of the disc gangs.

Another important object is achieved in that the mechanism for solving this problem and for making the gangs plow in a level position can be adjusted without disturbing the points of pull by the pull tongue from the tractor.

Another important objective is realized by the provision of a connection between the gang frames and main frame which includes means for permitting and causing the gang frames to be moved to a tilted position relative to the horizontal and for retaining such frames in such adjusted position, all without effecting the ability of the gang frames to be adjusted independently about a vertical axis to determine the relative angular disposition of such gangs in an offset disc harrow.

Yet another important object is realized in providing an adjustable levelling mechanism that is simple and durable in construction, efficient and positive in action, economical to manufacture, and capable of use by any one without requiring any complicated instructions.

The foregoing and numerous other advantages and objects of the invention will more clearly appear from the following detailed description of a preferred embodiment, particularly when considered in connection with the accompanying drawings, in which:

Fig. 1 is a top plan view of an offset disc harrow embodying my invention;

Fig. 2 is a diagrammatic view of a disc gang showing the scissoring action in the conventional offset disc harrow;

Fig. 3 is a diagrammatic view of a disc gang similar to Fig. 2, but showing the plowing action after adjustment of the levelling mechanism constituting the subject of the present application;

Figure 4:
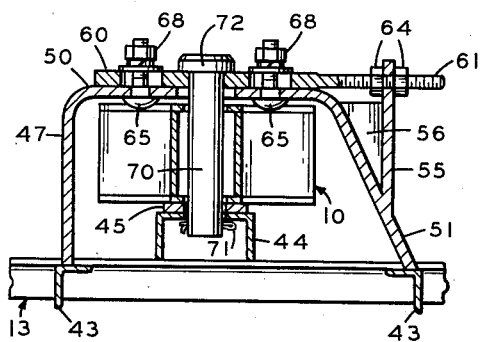
Fig. 4 is an enlarged cross sectional view of the levelling mechanism as seen along line 4—4 of Fig. 1.

Referring now by characters of reference to the drawings, and first to Fig. 1, it is seen that the disc harrow includes a main frame 10 extending centrally longitudinally of the harrow assembly, the main frame 10 being comprised of parallel side channels 11 and cross braces 12. Pivotally attached to each end of main frame 10 by a pivot-and-levelling mechanism to be described in detail subsequently, is a disc gang frame 13 and 14. A tie bar 15 is hingedly attached at one end 16 to front gang frame 13 and hingedly attached at the opposite end 17 to rear gang frame 14, the tie bar 15 extending below the main frame 10 and connecting the trailing sides of gang frames 13 and 14.

It is noted at this point in order to define subsequent reference, that the leading side 20 of gang frame 13 is the left hand side (Fig. 1) while the trailing side 21 is the right hand side. Obviously when the harrow is utilized, the leading side 20 of gang frame 13 is located ahead of the trailing side 21. In an offset disc harrow the rear gang frame 14 is relatively reversed so that the leading side 22 of rear gang frame 14 is the right hand side (Fig. 1), while the trailing side 23 is the left hand side. It is seen that the leading side of each gang frame 13 and 14 is that side toward which the concave sides of the disc gang carried by such frame are directed.

A set bar 24 is hingedly attached to the leading side 22 of rear gang frame 14, the set bar 24 extending forwardly to a longitudinal adjustable connection 25 with the trailing side 21 of the front gang frame 13.

The wheel assembly of the offset disc harrow includes a frame structure 26 attached to a substantially medial portion of main frame 10, the wheel structure 26 extending laterally outwardly on each side of main frame 10 and mounting a pair of ground wheels 27. The ground wheels 27 engage the earth and prevent any rotational movement of the main frame 10 about its longitudinal axis.

Each of the gang frames 13 and 14 mount a transverse shaft 30 on which is carried a plurality of harrow discs 31. As stated and defined previously, the concave sides of the discs 31 of gang frame 13 are directed toward the left hand side (Fig. 1) toward leading side 20. The concave sides of the harrow discs 31 carried by rear gang frame 14 are directed toward the right hand side (Fig. 1) or the leading side 22.

The tractor connection to the disc harrow includes a draw bar 32 hingedly connected at one end to the front portion of the leading side 20 of front gang frame 13 and hingedly connected at the opposite end to the front end of set bar 24. The conventional tongue 33 and brace 34 are hingedly connected to draw bar 32.

Figure 5:
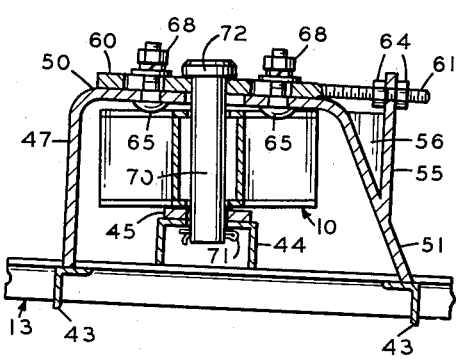
Fig. 5 is a cross sectional view of the levelling mechanism similar to Fig. 4 above, but showing the disc gang in an adjusted initial position.
Figure 6:
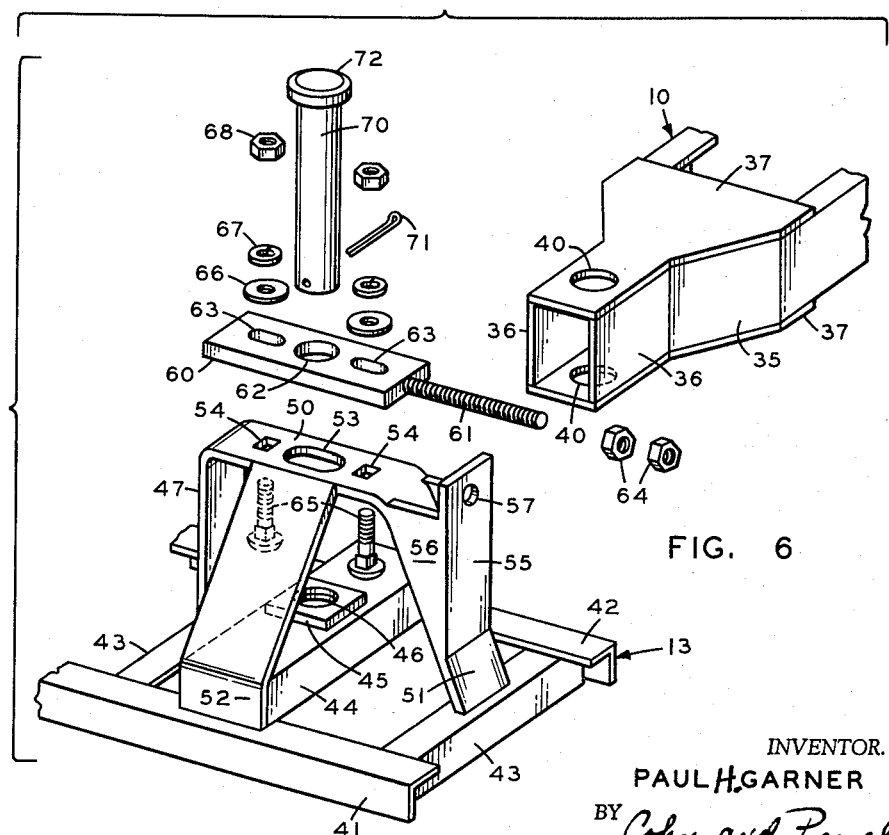
Fig. 6 is an exploded view showing the gang frame, the main frame and the levelling mechanism.

Adjustable pivot-and-levelling mechanism is connected between main frame 10 and gang frames 13 and 14 as is best shown in Figs. 4–6 inclusive. The levelling mechanism connecting the front gang frame to main frame 10 is of identical construction to the mechanism connecting the opposite end of main frame 10 with rear gang frame 14, but with the only exception of a mere reversal of certain parts. Therefore, a detailed description of one levelling mechanism will suffice for the other.

The front end of main frame 10 includes a converging portion 35 and straight, parallel side portions 36. The top and bottom of the main frame 10 are closed by closure plates 37. The plates 37 are provided with vertically aligned circular apertures 40 between side portions 36.

The front gang frame 13 includes a front angle member 41 and a rear angle member 42 interconnected by a plurality of cross braces 43. Extending between and attached to front and rear gang frame members 41 and 42 is an inverted U-shaped channel 44 that includes a top plate portion and depending side flanges. Fxed to the top of channel 44 is a substantially square plate member 45; aligned circular apertures 46 are provided in plate member 45 and channel 44.

Further, the levelling mechanism includes a bracket yoke having a substantially vertical portion 47 fixed to a cross brace 43 of the gang frame 13 at one side of the main frame end, an integral top portion 50 that overlies the uppermost closure plate 37 of the main frame end, an integral inclined portion 51 disposed on the opposite side of the main frame end and fixed to another cross brace 43, and an integral front portion 52 attached to the front end of channel 44 and to front gang frame member 41.

Formed in top bracket portion 50 is an elongate aperture 53 extending in the direction of the disc gangs, the aperture 53 being vertically aligned with apertures 46. A substantially square carriage bolt hole 54 is provided in top bracket portion 50 at each side of elongate aperture 53.

A bracket plate 55 is fixed to the inclined bracket portion 51 and extends vertically upwardly above the horizontal top bracket portion 50. Gusset plates 56 serve as reinforcing for bracket 55. A circular hole 57 is provided in the top portion of bracket plate 55, the purpose of which will become clear upon subsequent detailed description of parts of the levelling mechanism.

An adjusting plate 60 constituting a lever arm is located over top bracket portion 50, and includes a threaded rod 61 adapted to interfit bracket hole 57. The adjusting plate 60 is provided with a circular opening 62 that is normally aligned with elongate aperture 53, and is provided at each side of circular aperture 62 with an elongate slot 63 that aligns with one of the carriage bolt holes 54.

Interconnecting adjusting plate 60 to the bracket yoke, the threaded rod 61 is inserted in hole 57 and is fixed in position by nuts 64 located on opposite sides of bracket plate 55. A pair of carriage bolts 65 is located in square holes 54 and extend upwardly through slots 63. Washers 66, lock washers 67, and nuts 68 are attached to carriage bolts 65 and serve to hold the adjusting plate 60 in its position on top bracket portion 50.

A pivot pin 70 is located in opening 62 of adjusting plate 60, in elongate aperture 53 of top bracket portion 50, and extends through apertures 46 in channel 44. The lower end of pivot pin 70 is fixed by a cotter pin 71 constituting an attachment means to prevent unintentional withdrawal of the pivot pin 70. The head 72 of pivot pin 70 seats on the top of adjusting plate 60.

It will be particularly noted at this point that the diameter of circular opening 62 in adjusting plate 60 closely approximates the outer diameter of pivot pin 70, as does the diameter of apertures 40 formed in the plates 37 of the main frame 10. The pivot pin 70 is held by main frame 10 in a fixed angular relation to the main frame 10. The aperture 63 is larger in its longitudinal direction than the diameter of pin 70 to permit relative movement of the pin in the aperture. The margins of elongate aperture 63 constituting guide means that engage the pin 70 and hence determine the direction of tilt. The apertures 46 formed in plate member 45 and channel 44 are slightly larger than the diameter of the pin 70 to permit a slight pivotal movement of the bracket yoke and gang frame 13 at this zone above cotter pin 71 while the pin 70 is moved relatively in aperture 53 upon levelling adjustment as explained later in describing the operation of this disc harrow.

As was stated previously, the pivot-and-levelling mechanism connecting the rear gang frame 14 with the rear end of the main frame 10 is exactly the same as the mechanism just described but is reversed as is illustrated in Fig. 1 for the obvious reason that the disposition of the leading side 22 is reversed.

As is conventional in offset disc harrows, the front and rear gangs 13 and 14 can be angularly related and retained in such angular relation by adjustment of tie bar 15 and set bar 24.

As viewed in Fig. 1, the discs 31 of front gang 13 will throw the earth to the left while the discs of rear gang frame 14 will throw the earth to the right. To adjust the gang frames 13 and 14 to the desired angular relation, the gangs are rotatable about the vertical axes afforded by pivot pins 70.

In an offset disc harrow, the leading side 20 of front gang 13 and the leading side 22 of rear gang 14 will tend to penetrate the soil more deeply than the trailing sides 21 and 23 respectively. This inherent tendency is illustrated in Fig. 2 in which a disc gang is shown with the leading side penetrating deeper than the trailing side by an amount equal to the difference between the distances illustrated by reference characters $a$ and $b$. The levelling mechanisms can be adjusted to compensate for this inherent scissoring action.

For example, in order to compensate the front disc gang, the carriage bolts 65 are loosened to release adjusting plate 60, and then nuts 64 are threadedly adjusted on threaded rod 61 to shorten its effective length. It will be apparent from Figs. 4 and 5 of the drawings that the main frame 10 is held stationary, and that such frame 10 holds the pivot pin 70 in a vertical position. Because aperture 62 of adjusting plate 60 closely embraces and engages the pivot pin 70, the effect of the pivot adjustment of rod 61 is to pivot the entire bracket yoke and hence the entire disc gang frame 13 about a pivot zone defined by apertures 46 at the lower connection of pivot pin 70 to channel 44, whereby to tilt the leading side 20 of the gang frame upwardly as is illustrated in Fig. 5. Then, the carriage bolts 65 are tightened to securely retain adjusting plate 60 to the top bracket portion 50 in the adjusted position, and hence the disc gang frame 13 is held in the adjusted inclined position.

Because the tendency is for the leading side 20 of the gang frame 13 to penetrate deeper than the trailing side 21, and because the gang frame 13 is held in an initial inclined position, the overall effect is for the disc gang to assume a position in which the discs provide a regular, even depth of cut, as is illustrated in Fig. 3.

Obviously, the rear gang frame 14 can be inclined to raise its leading side 22 by a simple adjustment of the levelling mechanism connecting such rear gang 14 to the rear end of main frame 10, all in the manner previously described with respect to the front gang frame 13.

Of course, the condition of the soil has a great deal to do with the degree of inherent scissoring action, and hence effects the amount of adjusted inclination of the disc gang frame. Every soil condition can be compensated by initial adjustment of adjusting plate 60 in the manner previously described to cause more or less inclination of the disc gang frame.

It will be apparent that when both front and rear gangs 13 and 14 are adjusted to an initially inclined position upon adjustment of the levelling mechanism, the scissoring action is compensated so that both gangs 13 and 14 provide an even depth of cut for their entire length, thus providing a level plowing action.

Although the invention has been described by making detailed reference to a single preferred embodiment, such detail is to be understood in an instructive, rather than in any restrictive sense, many variants being possible within the scope of the claims hereunto appended.

I claim as my invention:

1. In a disc harrow, a main frame, a gang frame extending transversely of said main frame, the main frame being provided with vertically spaced apertures, a vertical pivot pin extending through said main frame apertures and engaging said main frame, the main frame apertures closely approximating the outer dimension of said pivot pin so that the relative position of said pin and main frame is maintained at all times, attachment means connecting one end of said pivot pin to said gang frame to permit the sides of said gang frame to be tilted from the horizontal about such attachment means, a guide means attached to said gang frame engaging the pivot pin to determine the direction of tilt, a lever means attached to said pivot pin, and means adjustably connecting said lever means to said gang frame for varying the length of the said lever means between the gang frame and pivot pin for holding the gang frame in adjusted tilted position.

2. In a disc harrow, a gang frame, a disc gang carried by said gang frame, a bracket yoke attached to said gang frame, said bracket yoke being provided with a slot extending in the same direction as the disc gang, a main frame located between the bracket yoke and gang frame, the gang frame extending transversely of said main frame, ground wheels carried by and located on opposite sides of said main frame, a pivot pin carried by said main frame and maintained by said main frame in a fixed angular relation to the main frame, attachment means connecting one end of said pivot pin to said gang frame to permit the sides of said gang frame to be tilted from the horizontal about said attachment means, the pivot pin having its other end received in said slot to determine the direction of such tiltable movement, a lever arm closely embracing and engaging the said other end of said pivot pin, and an adjustable connection between the lever arm and said bracket yoke for varying the length of said lever arm between the yoke and pivot pin so as to hold the pivot pin in relatively adjusted position in said slot and to maintain said gang frame in adjusted tilted position.

3. In a disc harrow, a front gang frame, a rear gang frame, a main frame extending between said gang frames, ground wheels carried by and located on opposite sides of said main frame precluding rotation of said main frame about its longitudinal axis, a pivot means connecting said main frame to a medial portion of each of said gang frames, at least one of said pivot means including a pivot pin carried by said main frame and maintained by said main frame in fixed angular relation to the longitudinal axis of said main frame, attachment means interconnecting the pivot pin and one of said gang frames with which it is associated for permitting the sides of the said one gang frame to be adjustably tilted from the horizontal about said attachment means, a lever means attached to said pivot pin, and means adjustably connecting the lever means to the said one gang frame for varying the length of the lever means between the one said gang frame and said pivot pin to hold the said one gang frame in adjusted tilted position.

4. In a disc harrow, a front gang frame, a rear gang frame, a main frame extending horizontally between said gang frames, ground wheels carried by and located on opposite sides of said main frame for precluding rotation of said main frame about its longitudinal axis, a pivot means connecting said main frame to a substantially medial portion of each of said gang frames, at least one of said pivot means including a pivot pin carried by said main frame and maintained in a vertical position by said main frame relative to the horizontal position of said main frame, attachment means loosely connecting the lower end of said pivot pin to the one gang frame with which it is associated so that the sides of said gang frame can be adjustably tilted from the horizontal about said attachment means, a bracket yoke attained to the said one gang frame and overlying said main frame, said bracket yoke being provided with a slot extending sideways of said one gang frame, said pivot pin having its upper end located in said slot and engaging said bracket yoke to determine the direction of tilt of said one gaing frame, and a lever arm closely embracing and engaging the upper end of said pivot pin, adjustment means interconnecting the lever arm to said bracket yoke for varying the effective length of said lever arm between the yoke and pivot pin so as to retain the pivot pin in adjusted position in said slot and to hold the said one gang frame in adjusted tilted position.

5. In a disc harrow, a front gang frame, a rear gang frame, a main frame extending between and interconnecting said gang frames, the gang frames extending transversely of said main frame, ground wheels carried by and located on opposite sides of said main frame, a pivot pin connecting said main frame to each of said gang frames, said main frame closely embracing each said pivot pin to hold said pivot pins in a fixed angular relation to said main frame, attachment means connecting each pivot pin to one of said gang frames to permit the sides of each gang frame to be tilted from the horizontal about such attachment means, a lever means attached to each pivot pin, and means adjustably connecting each lever means to the gang frame with which it is associated for varying the length of said lever means between the gang frame and pivot pin for holding the gang frame in adjusted tilted position.

6. In a disc harrow, a front gang frame and a rear gang frame, a main frame extending horizontally and interconnecting said gang frames, the gang frames extending transversely of said main frame, ground wheels carried by and located on opposite sides of said main frame to preclude rotation of said main frame about its longitudinal axis, a guide means attached to each gang frame, said main frame having opposite ends located between said guide means and said gang frames, a pivot pin carried by each end of said main frame and maintained in vertical position relative to said horizontal main frame, attachment means connecting each pivot pin to one of said gang frames so that said gang frames can be adjustably tilted from the horizontal about such attachment means, each pivot pin engaging one of said guide means to determine the direction of tilt, and a lever attached to each pivot pin, and means adjustably connecting one lever to each gang frame for varying the length of said lever between the gang frame and pivot pin for holding the gang frame in adjusted tilted position.

7. In a disc harrow, a front gang frame, a rear gang frame, a main frame extending horizontally between and interconnecting said gang frames, the gang frames extending transversely of said main frame, ground wheels carried by and located on opposite sides of said main frame to preclude rotation of said main frame about its longitudinal axis, guide means attached to each gang frame, said main frame having opposite ends disposed between said guide means and said gang frames, a pivot pin carried by each end of said main frame and maintained by said main frame in a vertical position relative to said horizontal main frame, attachment means connecting one end of each pivot pin to one of said gang frames so that said gang frames can be adjustably tilted from the horizontal about said attachment means, each pivot pin having its other end engageable with one of said guide means to determine the direction of tilt, a lever arm closely embracing and engaging each pin, and means adjustably connecting each lever arm with the gang frame associated with each pin for varying the length of said lever arm between the pivot pin and the gang frame so as to hold the pin in adjusted position relative to the guide means and to tilt and retain the gang frame.

8. In a disc harrow, a front gang frame, a rear gang frame, a main frame extending between and interconnecting said gang frames, the gang frames extending transversely of said main frame, a bracket yoke attached to each gang frame, said main frame having opposite ends located between said bracket yoke and gang frames, a pivot pin carried by each end of said main frame and maintained in a fixed angular relation to said main frame at all times, attachment means connecting one end of each pivot pin to one of the gang frames so that said gang frames can be tilted from the horizontal about the attachment means, each bracket yoke being provided with a slot extending sideways of the gang frame with which it is associated, each pivot pin having its other end located in said slot of one of yokes, and engaging the yoke to determine the direction of tilt, a lever arm closely embracing and engaging the other end of each pivot pin and means adjustably connecting each lever arm with the gang frame associated therewith for varying the length of said lever arm between the pivot pin and means adjustably connecting the lever arm with the gang frame, to hold the pivot pin in relative adjusted position in said slot and to retain the gang frame in adjusted tilted position.

9. In an offset disc harrow, a front gang frame, a rear gang frame, means for holding said gang frames in opposed angular relation, a main frame extending horizontally between and interconnecting said gang frames, the gang frames extending transversely of said main frame, ground wheels carried by and located on opposite sides of said main frame to preclude rotation of said main frame about its longitudinal axis, a bracket yoke attached by each gang frame, said main frame having opposite ends located between said bracket yokes and gang frames, a pivot pin carried by each end of said main frame and retained in a vertical position relative to the horizontal main frame by said main frame, attachment means connecting one end of each pivot pin to one of the gang frames so that each gang frame can be tilted from the horizontal about said attachment means, each bracket yoke being provided with a slot receiving and guiding the other end of one of said pivot pins, each slot extending substantially sideways of the gang frame with which it is associated, and a lever arm closely embracing and engaging the said other end of each pivot pin, and an adjustable connection attaching each lever arm with one of the bracket yokes with which it is associated so as to vary the length of the lever arm, one of the lever arms extending laterally to one side of the main frame, the other lever arm extending laterally to the other side of said main frame, one of said adjustable lever arms holding the front gang frame in a tilted position with one side raised and the other adjustable lever arm holding the rear gang frame in a tilted position with the opposite side raised, whereby to compensate for any scissoring action.

References Cited in the file of this patent

UNITED STATES PATENTS

| | | |
|---|---|---|
| 615,718 | Kouns | Dec. 13, 1898 |
| 2,601,165 | Moore | June 17, 1952 |
| 2,633,686 | Domries | Apr. 7, 1953 |
| 2,783,700 | Sindelar | Mar. 5, 1957 |

FOREIGN PATENTS

| | | |
|---|---|---|
| 1,071,580 | France | Mar. 3, 1954 |